3,692,633
PROCESS FOR PREPARING 6-CHLORO-2-QUIN-
OXALINECARBOXYLIC ACID-1,4-DIOXIDE
Edward O. Stapley, Spotwood, N.J., Justo M. Mata, Madrid, Spain, and Frank J. Wolf, Westfield, and Thomas W. Miller, Carteret, N.J., assignors to Merck & Co., Inc., Rahway, N.J.
No Drawing. Original application Sept. 26, 1968, Ser. No. 763,008, now Patent No. 3,598,819, dated Aug. 10, 1971. Divided and this application Aug. 21, 1970, Ser. No. 66,129
Int. Cl. C12d 9/00
U.S. Cl. 195—80 R        1 Claim

ABSTRACT OF THE DISCLOSURE

A novel antibiotic substance, identified as 6-chloro-2-quinoxalinecarboxylic acid-1,4-dioxide, has been produced by cultivating strains of *Streptomyces ambofaciens*, var. NRRL 3455. The salts, as well as derivatives such as esters, amides and N-substituted amides, likewise demonstrate antibiotic activity.

---

This is a division of application Ser. No. 763,008 filed Sept. 26, 1968, now U.S. Pat. No. 3,598,819.

This invention relates to new antibiotic agents and processes of preparing the same. More particularly, it is concerned with a novel antibiotic substances 6-chloro-2-quinoxalinecarboxylic acid 1,4-dioxide and its salts, as well as certain derivatives thereof such as esters, amides, hydrazides, and N-substituted amides, and also to processes for their production.

The discovery of the remarkable antibiotic properties of penicillin stimulated great interest in this field which has resulted in the finding of many other valuable antibiotic substances such as: streptomycin, streptothricin, gramicidin, subtilin, bacitracin, chlortetracycline, oxytetracycline, and the like. In general, such antibiotics are particularly active against certain gram negative bacteria, and some are active against both gram negative and gram positive bacteria. However, the activity of these known antibiotics is usually limited to a few pathogenic microorganisms, and work has been continued in this field in an attempt to find other antibiotics which would be effective against other pathogens.

Although some of these antibiotics have been found to be invaluable in the treatment of various diseases, it is found that certain strains of some pathogens develop a resistance to a particular antibiotic, and as a result the antibiotic is no longer active against such resistant strains.

Accordingly, the deficiencies of the known antibiotics has stimulated further research to find other antibiotics which will be active against a wider range of pathogens as well as resistant strains of particular microorganisms.

The new antibiotic substance of the present invention is produced by growing, under controlled conditions, a previously unknown variety of microorganism which had been isolated from a sample of soil from North Carolina. This new microorganism has been designated *Streptomyces ambofaciens* var. MA-2870 in the culture collection of Merck & Co., Inc., Rahway, N.J. A culture thereof has been deposited with the Fermentation Section of the Northern Utilization Research Branch, United States Department of Agriculture at Peoria, Ill., and added to its permanent culture collection as NRRL 3455.

The morphological and cultural characteristics of *Streptomyces ambofaciens* var. MA-2870 are set forth in the following table: All readings were taken after 3 weeks of incubation at 28° C. except where noted. The pH of the media is neutral (6.8–7.8).

Morphology: Sporophores form spirals; spores spherical to oval 0.9 x 1.5$\mu$.

Tomato paste-oatmeal agar

Vegetative growth: Reverse—brown
Aerial mycelium: Flat, grainy, medium gray
Soluble pigment: Light brown Czapek-Dox agar (sucrose nitrate agar)

Vegetative growth: Reverse—orange-brown
Aerial mycelium: Tan to grayish yellow
Soluble pigment: Light brown Glycerol-aspargine agar Vegetative growth: Tan to yellow-orange
Aerial mycelium: Moderate, light to medium gray
Soluble pigment: Light tan Egg albumin agar Vegetative growth: Tan to light yellow-orange
Aerial mycelium: Moderate, light gray to medium gray
Soluble pigment: None Nutrient agar Vegetative growth: Reverse—tan to brown
Aerial mycelium: Gray
Soluble pigment: None Calcium malate agar Vegetative growth: Raised, spreading, greenish yellow
Aerial mycelium: Brownish gray
Soluble pigment: None
Clear zone surrounding growth Skim milk agar Vegetative growth: Flat, spreading, dark brown
Aerial mycelium: Moderate, grayish white
Soluble pigment: Brown
Hydrolysis of casein: Moderate Skim milk Vegetative growth: Cream to brown ring
Aerial mycelium: Scant, whitish
Soluble pigment: Very light brown
No apparent change in consistency or pH Litmus milk Vegetative growth: Dark brown ring
Aerial mycelium: Scant, brownish
No apparent change in consistency or pH Nutrient starch agar Vegetative growth: Tan
Aerial mycelium: Gray
Soluble pigment: Tan
Hydrolysis of starch: Weak Nutrient gelatin agar Vegetative growth: Tan
Aerial mycelium: Grayish white
Soluble pigment: Tan
Liquefaction: Weak Gelatin stab Flaky, cream-colored growth on surface
Soluble pigment: None
Liquefaction: None Nutrient tyrosine agar Vegetative growth: Tan
Aerial mycelium: Brownish gray
Soluble pigment: Brown
Tyrosine crystals decomposed Peptone-iron-yeast extract agar Vegetative growth: Tan
Aerial mycelium: None
Soluble pigment: None Potato plug Vegetative growth: Brown
Aerial mycelium: Light lavender-gray
Soluble pigment: Tan Loeffler's blood serum slants Vegetative growth: Tan to brown
Aerial mycelium: None
Soluble pigment: Tan
Liquefaction: None Micro-aerophilic growth (Yeast extract-dextrose agar stab—40 mm. depth)
Good surface growth and along upper ⅓ of stab line
Reduction of nitrates (organic medium)—positive Temperature:
   Good growth at 28° C.
   No growth at 50° C.
Carbohydrate utilization (Pridham-Gottlieb Basal synthetic medium—1% carbohydrate)
Moderate growth on glucose, xylose, mannose, rhamnose, maltose and inositol
No growth on arabinose, fructose, mannitol, sucrose, raffinose, lactose and cellulose The above cultural characteristics were compared with those of known species as described in the Actinomycetes, vol. 2, S. A. Waksman (Williams and Wilkins, 1962), page 173. Based on this comparison, the most closely related species found is *Streptomyces ambofaciens*. A slightly different response in nitrate reduction tests and some differences in carbohydrate utilization are considered to be strain characteristics insufficient to determine a new species. Accordingly, this organism is designated as *Streptomyces ambofaciens* var. MA-2870.

The above description of the microorganism-producing the new antibiotic substance of this invention is given as illustrative of suitable strains of *Streptomyces ambofaciens* which can be used in the production of the new antibiotic of this invention, but it is to be understood that the present invention is not to be limited to organisms answering this particular description. The present invention also contemplates the use of other species of *Streptomyces ambofaciens* which are mutants of the desired organisms such as those obtained by natural selection, or those produced by mutating agent, for example, X-ray irradiation, ultraviolet irradiation, nitrogen mustards, and the like.

The antibiotic substance produced by *Streptomyces ambofaciens* var. MA-2870 is differentiated from known antibiotics on the basis of its profile of activity in standardized antibacterial spectrum and cross resistance tests. The method in general is described in "Cross Resistance Studies and Antibiotic Identification," Applied Microbiology 6, 392-398 (1958). Comparison of these data with data obtained with known antibiotics results in the conclusion that this is a new antibiotic substance.

TABLE I
A.—ANTIBACTERIAL SPECTRUM

| Test Organism | Inhibition zone diameter, mm. | |
|---|---|---|
| | $NH_4$-salt, 1 mg./ml. | Na salt, 1 mg./ml. |
| *Escherichia coli* ATCC 9637 | 15 | 19 |
| *Bacillus* species | 16 | 18 |
| *Proteus vulgaris* | 26 | 27 |
| *Pseudomonas aeruginosa* | ¹7 | ¹7 |
| *Serratia marcesens* ATCC 990 | 12 | 13 |
| *Staphylococcus aureus* ATCC 6538P | ¹7 | ¹7 |
| *Bacillus subtilis* ATCC 6633 | 19 | 18 |
| *Sarcina lutea* ATCC 9541 | 10 | 12 |
| *Staphylococcus aureus* (Streptomycin-Streptothricin-resistant) | 25 | 25 |
| *Streptococcus faecalis* | 11 | 13 |
| *Alcaligenes faecalis* ATCC 213 | 21 | 24 |
| *Brucella bronchiseptica* ATCC 4617 | 16 | 13 |
| *Salmonella gallinarum* | 20 | 21 |
| *Vibrio percolans* ATCC 8461 | 18 | 23 |
| *Xanthomonas vesicatoria* | 17 | 18 |

B.—CROSS-RESISTANCE SPECTRUM

| *Escherichia coli*—Strain ²: | | |
|---|---|---|
| Sensitive parent | 15 | 19 |
| Streptomycin-resistant | 17 | 17 |
| Streptothricin-resistant | 19 | 21 |
| Oxamycin-resistant | 13 | 17 |
| Pleocidin-resistant | 36 | 37 |
| Chloramphenicol-resistant | ¹7 | ¹7 |
| Chlortetracycline-resistant | 8 | ¹7 |
| Oxytetracycline-resistant | ¹7 | ¹7 |
| Neomycin-resistant | 31 | 35 |
| Tetracycline-resistant | 11 | ¹7 |
| Viomycin-resistant | ¹7 | ¹7 |
| Polymyxin-resistant | 21 | 23 |
| Grisein-resistant | 17 | 17 |

¹ Disc size is 7 mm.—a figure of 7 means no inhition.
² Test performed versus a series of strains of *E. coli* isolated from the same parent culture following exposure to the individual antibiotics.

In addition to the pattern of sensitivity in the spectrum and cross-resistance assays, the effect of the addition of various materials to the medium of the *E. coli* control plate was studied. These additions will affect the activity of various antibiotics differently as revealed by a change in zone size.

SPECIAL EFFECTS SPECTRUM (DISC-PLATE AGAR DIFFUSION METHOD)

| *Escherichia coli* with special addition noted | Inhibition zone diameter, mm. | |
|---|---|---|
| | $NH_4$ salt, 1 mg./ml. | Na-salt, 1 mg./ml. |
| Control—no additions | 15 | 19 |
| 0.1 M phosphate buffer pH 5 | 31 | 40 |
| 0.1 M phosphate buffer pH 7 | 13 | 21 |
| 0.1 M phosphate buffer pH 9 | ¹7 | ¹7 |
| Blood plasma 20% | ¹7 | 8 |
| Cation exchange resin (Dow ET 91) 1% | 22 | 20 |

¹ Disc size is 7 mm.—a figure of 7 means no inhibition.

All of the above tests of antibacterial spectrum, cross-resistance and special effects are performed by placing 7 mm. discs wet with the antibiotic solution on the agar surface of 100 mm. petri plates poured with 5 ml. of Difco nutrient agar plus 0.2% Difco yeast extract after inoculation with a suspension of the test microorganism.

The new antibiotic is produced during the aerobic fermentation of suitable aqueous media, under conditions described hereinafter, by *Streptomyces ambofaciens* var.

MA 2870. Aqueous media such as those employed for the production of other antibiotics are suitable for the production of the antibiotic. Such media contain sources of carbon and nitrogen assimilable by the microorganisms and inorganic salts. In addition, the fermentation media contain traces of metals necessary for the growth of the microorganisms which are usually present in complex sources of carbon and nitrogen of the medium.

In general, carbohydrates such as sugars, for example dextrose, maltose, dextrin, and the like, and starches are suitable sources of assimilable carbon in the nutrient mediums. The exact quantity of the carbon source which is utilized in the medium will depend, in part, upon the other ingredients of the medium, but it is usually found that an amount of carbohydrate between about 1 and 6% by weight of the medium is satisfactory.

These carbon sources can be used individually, or several such carbon sources may be combined in the medium.

Various nitrogen sources such as casein hydrolysates, papaic digests of soybean meal, peanut meal, peanut oil meal, distiller's solubles, corn steep liquors, sodium nitrate, ammonium chloride, ammonium sulfate, asparagine, NZ-amine and the like are readily assimilated by *Streptomyces ambofaciens* var. MA 2870 and can be used in the fermentation media for the production of the new antibiotic. In general, organic sources of nitrogen, particularly soybean meal, distiller's solubles, asparagine, and yeast extract, are very satisfactory for the production of antibiotic by *Streptomyces ambofaciens* var. MA 2870. The various organic and inorganic sources of nitrogen can be used either alone or in combination in amounts ranging from 0.1 to 6% by weight of the aqueous medium.

The following are examples of media suitable for growing *Streptomyces ambofaciens* var. MA 2870 and producing the new antibiotic.

MEDIUM NO. 1

| | Percent |
|---|---|
| Soybean meal | 3.0 |
| Sodium chloride | 0.25 |
| Dextrose | 2.0 |
| Distiller's solubles | 0.75 |
| $CaCO_3$ | 1.0 |
| pH | 7.0 |

MEDIUM NO. 2

| | |
|---|---|
| Dextrose | 1.0 |
| Asparagine | 0.1 |
| $K_2HPO_4$ | 0.01 |
| $MgSO_4 \cdot 7H_2O$ | 0.05 |
| Trace minerals [1] | 1.0 |
| pH | 7.2 |

[1] Trace mineral solutions:

| | | |
|---|---|---|
| $FeSO_4 \cdot 7H_2O$ | g | 1.0 |
| $MnSO_4 \cdot 4H_2O$ | g | 1.0 |
| $CuCl_2 \cdot 2H_2O$ | mg | 25.0 |
| $CaCl_2$ | mg | 100.0 |
| $H_3BO_3$ | mg | 56.0 |
| $(NH_4)_6Mo_7O_{24} \cdot 4H_2O$ | mg | 19.0 |
| $ZnSO_4 \cdot 7H_2O$ | mg | 200.0 |

Distilled water to make 1000 ml.

The fermentation can be carried out at temperatures ranging from about 20–37° C. For optimum results, it is found most convenient to conduct these fermentations at temperatures of 24–32° C. The pH of the nutrient media suitable for growing *Streptomyces ambofaciens* var. MA 2870 to produce the antibiotic can vary from about pH 6 to 9.0. A pH of about 7 to 7.5 is preferred.

Although the novel antibiotic is produced by both surface and submerged culture, it is presently preferred to carry out the fermentation in the submerged state. The antibiotic is prepared by aerated submerged growth in shaken Erlenmeyer flasks or stainless steel fermentors.

Further small-scale fermentations are conveniently carried out by placing suitable quantities of nutrient medium in flasks, sterilizing the flasks and contents by heating at 120° C., inoculating the flask with either spores or a vegetative cellular growth of strain of *Streptomyces ambofaciens* var. MA 2870, loosely stoppering the necks of the flasks with cotton and permitting the fermentation to proceed in a constant temperature room at about 25° C. on a shaker for about two to seven days. For large scale work, it is preferable to conduct the fermentation in suitable tanks provided with an agitator and a means of aerating the fermentation medium. In this method the nutrient medium is made up in the tank and sterilized by heating at 120° C. for a suitable length of time. After cooling, the sterilized medium is inoculated with a suitable source of vegetative cellular growth of *Streptomyces ambofaciens* var. MA 2870 and the fermentation is permitted to proceed from the two to seven days while agitating and/or aerating the nutrient medium and maintaining the temperature at about 28° C. This method is particularly suited for the preparation of large quantities of this new antibiotic.

In carrying out the production in the submerged state, a small amount of a suitable antifoam agent such as soybean oil, castor oil, lard oil, 1% octadecanol in mineral oil, a polyol, or a substituted oxazoline sold under the trade name "Alkaterge C," and the like can be added to the fermentation broth to control excessive foaming during the fermentation.

The new antibiotic substance produced by growing *Streptomyces ambofaciens* var. MA 2870 in suitable fermentation media can be recovered from the fermentation broth. It has been identified as 6-chloro-2-quinoxalinecarboxylic acid 1,4-dioxide.

In accordance with the present invention, it is found that the new antibiotic substance, 6-chloro-2-quinoxalinecarboxylic acid 1,4-dioxide and its salts, as well as certain derivatives thereof such as esters, amides, hydrazides and N-substituted-amides are active against various microorganisms. These compounds have the formula:

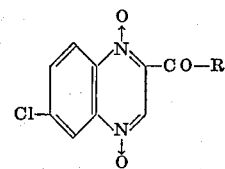

and pharmaceutically acceptable salts thereof, wherein

R is $-OR_1$, where $R_1$ is hydrogen, or alkyl having from one to five carbon atoms; or R is

where $R_2$ and/or $R_3$ are hydrogen or alkyl having from one to ten carbon atoms, and when $R_2$ is hydrogen, $R_3$ may be hydroxyalkyl, hydroxy or amino.

The novel compounds of this invention can be utilized to remove susceptible microorganisms from pharmaceutical equipment and the like, or to separate certain microorganisms from solutions containing mixtures of several microorganisms. They can also be utilized topically for the treatment of wounds and the like by the application of ointments containing 1–10% of the antibiotic substance in conventional vehicles.

The salts of 6-chloro-2-quinoxalinecarboxylic acid 1,4-dioxide are readily prepared by treating the free acid with a pharmaceutically acceptable base. The salts include, for example, the ammonium salt, salts of amines such as methylamine and ethylamine, alkali metal salts such as sodium and potassium, and salts of alkaline earth metals such as calcium or magnesium. Solutions of the crystalline 6-chloro-2-quinoxalinecarboxylic acid 1,4-dioxide may be used to make the salt. In the alternative, the filtered broth from the fermentation process may be adsorbed on a suitable resin, for example, a polystyrene resin containing quaternary ammonium group such as the commercial resin known as Dowex 1 X 2. The resin adsorbate is then eluted with an appropriate base or salt. The ammonium salt can be obtained, for example, by treating the resin adsorbate with ammonium bicarbonate.

The new antibiotic, 6 - chloro-2-quinoxalinecarboxylic acid 1,4-dioxide, has a carboxy group at the 2-position of the quinoxaline ring which forms esters with lower alkanols having from one to five carbon atoms. The carboxy groups forms an amide with ammonia, and N-substituted amides with compounds having an amino group, such as primary and secondary amines, alkanolamines, hydroxylamines or hydrazine.

The methyl ester is prepared by treating a slurry of the 6-chloro-2-quinoxalinecarboxylic acid 1,4-dioxide with diazomethane in a solvent. The product is recovered by concentration to dryness and crystallization from a suitable solvent. Other lower alkyl esters, such as ethyl, propyl or n-butyl are conveniently prepaed by reaction of methyl 6 - chloro-2-quinoxalinecarboxylate 1,4-dioxide with the corresponding alcohol, suitably in the presence of a base such as triethylamine, using an excess of the alcohol as solvent.

The methyl 6-chloro-2-quinoxalinecarboxylate 1,4-dioxide is readily converted to the amide, suitably by adding concentrated ammonium hydroxide to a solution of the ester in a solvent. Methanol is preferred as the solvent.

The N-substituted-carboxamides of 6-chloro-2-quinoxalinecarboxylic acid 1,4-dioxide are prepared by reaction of a lower alkyl ester with the appropriate amino compound, suitably in an alcoholic solution at room temperature. Reaction is completed after standing for several hours or for several days with agitation, if necessary.

In vitro studies demonstrate a wide spectrum of activity against both gram positive and gram negative bacteria by the disc-plate agar diffusion method following the procedure described above. Details are given in Table II.

The methyl ester and the amide are the preferred embodiments of the invention. These products are conveniently prepared from readily available starting materials and exhibit substantial antibiotic activity.

The examples which follow are presented as illustrative of methods useful in the production of 6-chloro-2-quinoxalinecarboxylic acid 1,4-dioxide and derivatives thereof.

EXAMPLE 1

6-chloro-2-quinoxalinecarboxylic acid 1,4-dioxide

Shake flask batches of the antibiotic are prepared in the following manner. A lyophilized culture of *Streptomyces ambofaciens* is suspended in water and used to inoculate slants of the following sterilized medium: yeast extract—10 g., dextrose—10 g., $MgSO_4 \cdot 7H_2O$—0.05 g., phosphate buffer—2 ml. ($KH_2PO_4$—91 g., $Na_2HPO_4$—95 g., distilled water to make 1000 ml., pH adjusted to 7.0), Difco agar—20 g., distilled water to make 1000 ml. The slants are incubated at 28° C. until mature (7–10 days) and then held at 4° C. until used. For each experiment, one of these slants is used to inoculate several seed flasks containing the following medium: meat extract 3 g., NZ-amine (an enzymatic digest of casein which is a source of peptones)—10 g., dextrose—10 g., NaCl—5 g., distilled water to make 1000 ml. and the pH is adjusted to 7.2. The medium is then dispersed in 50 ml. amounts into 250 ml. baffled Erlenmeyer flasks before sterilization. The inoculated flasks are shaken at 28° C. on a 220 r.p.m. shaker (2" throw) and 3 days at which time good growth is obtained.

The seed flasks are pooled and used to inoculate production flasks (7–9 ml. per flask) of the following medium: dextrose—10 g., asparagine—1 g., $K_2HPO_4$—0.1 g., $MgSO_4.7H_2O$—0.5 g., yeast extract—0.5 g., trace element mix (consisting of $FeSO_4.7H_2O$—1.0 g., $MnSO_4.4H_2O$—1.0 g., $CuCl_2.2H_2O$—25 mg., $CaCl_2$—100 mg., $H_3BO_3$—56 mg., $(NH_4)_6Mo_7O_{24}.4H_2O$—19 mg., $ZnSO_4.7H_2O$—200 mg., distilled water to make 1000 ml.)—10 ml., distilled water to make 1000 ml. The ph is adjusted to 7.2. The medium is dispensed in 350 ml. amounts into 2 liter baffled Erlenmeyer flasks before sterilization. The inoculated production flasks are shaken at 135 to 140 r.p.m. (2" throw) at 28° C. for 7–8 days. The contents of the flasks of each batch are then pooled, assayed, and used for extraction.

The antibiotic potency of the broth samples is determined by disc-plate agar diffusion assays in a chemically defined medium seeded with washed cells of *Escherichia coli* (ATCC 9637). The composition of the assay medium is as follows: Solution A contains: $K_2HPO_4$—0.7 g., $KH_2PO_4$—0.3 g., sodium citrate—0.5 g., $MgSO_4.7H_2O$—0.1 g., monosodium glutamate—12.0 g., agar—15,0 g., distilled water—800 ml. Solution B contains: dextrose—2.0 g., methionine—0.02 g. and distilled water—200 ml.

Solutions A and B are sterilized separately for 20 minutes at 120° C., cooled to 50° C., combined, and seeded with 5 ml. of a saline-washed *Eschorichia coli* suspension optical density—0.22) per 150 ml. of medium. Assay plates are poured so as to contain 5 ml. of medium per 100 mm. diameter petri plate. Filter paper discs 13 mm. diameter) are soaked in the solutions to be assayed and set on

TABLE II.—ANTIBACTERIAL SPECTRUM

Derivatives of 6-Chloro-2-Quinoxalinecarboxylic Acid 1,4-Dioxide (Disc-Plate Agar Diffusion Method)
[Inhibition zone diameter, mm. (7 mm.=disc size—no inhibition zone observed)]

| Test organism | A | B | C | D | E | F | G | H |
|---|---|---|---|---|---|---|---|---|
| *Escherichia coli* ATCC 9637 | 15 | 18 | 7 | 10 | 7 | 7 | 7 | 20 |
| *Bacillus* species | 14 | 31 | 32 | 25 | 24 | 25 | 16 | 28 |
| *Proteus vulgaris* | 22 | 24 | 13 | 21 | 18 | 13 | 13 | 26 |
| *Pseudomonas aeruginosa* | 7 | 7 | 7 | 7 | 7 | 7 | 7 | 7 |
| *Serratia marcescans* ATCC 990 | 11 | 10 | 7 | 7 | 7 | 7 | 7 | 10 |
| *Staphylococcus aureus* ATCC 6538P | 7 | 22 | 26 | 14 | 22 | 7 | 7 | 14 |
| *Bacillus subtilis* ATCC 6633 | 19 | 26 | 29 | 27 | 26 | 29 | 17 | 24 |
| *Sarcina lutea* ATCC 9341 | 13 | 15 | 26 | 11 | 15 | 7 | 7 | 12 |
| *Staphylococcus aureus* (Streptomycin-Streptothricin-resistant) | 24 | 24 | 25 | 27 | 21 | 23 | 21 | 32 |
| *Streptococcus faecalis* | 16 | 9 | 14 | 11 | 7 | 7 | 9 | 7 |
| *Alcaligenes faecalis* ATCC 213 | 7 | 7 | 7 | 8 | 7 | 7 | 7 | 10 |
| *Brucella bronchiseptica* ATCC 4617 | 13 | 8 | 7 | 7 | 7 | 7 | 7 | 12 |
| *Salmonella gallinarum* | 20 | 19 | 8 | 12 | 8 | 7 | 7 | 15 |
| *Vibrio percolans* ATCC 8461 | 17 | 16 | 18 | 11 | 14 | 15 | 10 | 20 |
| *Xanthomonas vesicatoria* | 15 | 11 | 7 | 7 | 7 | 7 | 7 | 19 |
| Diluent | $H_2O$ | 10% MeOH | 10% MeOH | 5% DMSO | 5% DMSO | MeOH[1] | 5% DMSO | 5% DMSO |

[1] Discs dried.

NOTE.—MeOH is methanol; DMSO is dimethylsulfoxide.
Derivatives of 6-chloro-2-quinoxalinecarboxylic acid 1,4-dioxide: A=Na salt, 1 mg./ml.; B=Methyl ester, 50 μg./ml.; C=N-butyl ester, 100 μg./ml.; D=Amide, 1 mg./ml.; E=N-methylamide, 1 mg./ml.; F=Ethanolamide, 500 μg./ml.; G=Hydrazide, 1 mg./ml.; H=N-hydroxy-2-carboxamide, 1 mg./ml.

the agar surface; the plates are then incubated at 37° C. for 18 hours. The diameters of the zones of inhibition are measured in millimeters to determine the degree of activity. Inhibition zones of 25 to 28 mm. in diameter are observed with the broth prepared as described in this example. The antibiotic is recovered as in Example 2 or 3.

EXAMPLE 2

6-chloro-2-quinoxalinecarboxylic acid 1,4-dioxide

A 100-gallon batch of the antibiotic is prepared by fermenting a culture of Streptomyces ambofaciens, NRRL 3455, in stages. To an agar slant culture of the microorganism is added 10 ml. of sterile medium of the formula described below. A cell suspension is prepared by scraping the surface of the growth, and 2.0 ml. of this suspension is added to a 250 ml. baffled Erlenmeyer flask containing 50 ml. of sterile nutrient medium of the following composition:

| | | |
|---|---|---|
| Yeast extract | g | 10 |
| Glucose | g | 10 |
| $MgSO_4 \cdot 7H_2O$ | g | 0.05 |
| Phosphate buffer [1] | ml | 2 |
| Water | ml | 1000 |

[1] 91 g. of $KH_2PO_4$ and 95.0 g. of $Na_2PO_4$ made up to 1 liter with distilled water.

The inoculated flask is incubated at 28° C. for 2 days on a 220 r.p.m. rotary shaker with a 2″ throw.

An inoculum of 10 ml. of the resulting vegetative growth is then used to inoculate a 2 liter baffled Erlenmeyer flask containing 500 ml. of sterilized medium of the following formula:

| | | |
|---|---|---|
| Beef extract, pH 7.0–7.2 | g | 3.0 |
| NZ-amine | g | 10.0 |
| Dextrose | g | 10.0 |
| NaCl | g | 5.0 |
| Distilled water | ml | 1000 |
| pH | | [1] 7.2 |

[1] Before sterilization.

The inoculated flask is then placed on a rotary shaker at 28° C. for 2 days.

The resulting fermentation broth is used to inoculate a 50 gallon stainless steel fermentor containing 160 liters of sterile medium of the composition shown above. The inoculated medium is incubated for 36 hours at 28° C. with agitation while maintaining an airflow of 3 cubic feet per minute through the fermenting broth. During the fermentation period, small amounts of an antifoaming agent are added to control foaming of the batch.

An inoculum of 43 liters of the resulting fermentation broth is then used to inoculate a 200 gallon stainless steel fermentor containing 510 liters of sterile medium of the following composition:

| | | |
|---|---|---|
| Dextrose | g | 10.0 |
| Asparagine | g | 1.0 |
| $K_2HPO_4$ | g | 0.1 |
| $MgSO_4 \cdot 7H_2O$ | g | 0.5 |
| Yeast extract | g | 0.5 |
| Trace mineral mix #2 [1] | ml | 10 |
| Water | ml | 1000 |

[1] Trace element mix #2:

| | | |
|---|---|---|
| $FeSO_4 \cdot 7H_2O$ | g | 1.0 |
| $MnSO_4 \cdot 4H_2O$ | g | 1.0 |
| $CuCl_2 \cdot 2H_2O$ | g | 0.025 |
| $CaCl_2$ | g | 0.1 |
| $H_3BO_3$ | g | 0.056 |
| $(NH_4)_6Mo_7O_{24} \cdot 4H_2O$ | g | 0.019 |
| $ZnSO_4 \cdot 7H_2O$ | g | 0.2 |
| Distilled water | ml | 1000 |

The pH of this medium is adjusted to 7.2 before sterilization. The inoculated broth is then incubated at a temperature of 28° C. with agitation while maintaining an airflow of 10 cubic feet per minute for 100 hours. During the fermentation, an antifoam agent is added in small quantities to prevent excessive foaming of the fermentation broth.

During the fermentation, assay of the amount of antibiotic present is determined on small filtered samples after 24, 48, 72 and 96 hours using the following method:

A standard curve for the assay is prepared by dissolving a sample of the sodium salt of the antibiotic in water and diluting to 20 mcg./ml. A 5 ml. sample of this solution is adjusted to pH 2.5 and extracted with 5 ml. of chloroform. The chloroform is separated and back-extracted with an equal volume of 1% $NaHCO_3$ solution. The back extract is diluted 1:5 in water and the UV absorption at 383 m$\mu$ is measured with a spectrophotometer. Calculations based on an $E_{1\,cm.}^{1\%}$ of 420 for 819A sodium salt indicates a recovery of 77% over the two extractions. Samples of filtered broth are treated in the same manner and the concentration of antibiotic in each sample is calculated. The batch is harvested after 100 hours based on these results.

The broth is filtered, using infusorial earth as a clarifying agent as needed, and the cake is discarded. The filtrate is adjusted to pH 8.0 to 10.2 and the downflow is adsorbed on chloride cycle resin (a polystyrene containing quarternary ammonium groups—Dowex 1 X 2) at the rate of about 2 liters/minute. The resin adsorbate is washed with distilled water and eluted with a mixture of 3 gallons water, 7 gallons methanol and 1200 g. of $NH_4Cl$. Ten one-gallon cuts are collected and stored at 0–10° C.

The eluate fractions 3, 4, 5 and 6 are pooled, diluted with an equal volume of water, adjusted to pH 2.5, and extracted twice with an equal volume of chloroform. The combined extracts are dried with filter-aid and concentrated to 5.6 liters. A 200 ml. portion of the concentrate is extracted with 10 ml. of 1% sodium bicarbonate and this extract is acidified with 2 ml. of acetic acid. The antibiotic crystallizes as the free acid. A portion of the product is recrystallized by dissolving it in 3 ml. of 1% sodium bicarbonate and acidifying again with 1 ml. of acetic acid to yield 6-chloro-2-quinoxalinecarboxylic acid 1,4-dioxide.

UV (.004 M phosphate buffer) pH 7

| $\lambda$ max., m$\mu$ | E% |
|---|---|
| 244 | 950 |
| 259 | 965 |
| 366 | 505 |
| 383 | 515 |

EXAMPLE 3

Ammonium 6-chloro-2-quinoxalinecarboxylate 1,4-dioxide

A shake flask batch of 3300 ml. of filtered broth (prepared as in Example 1) is adsorbed at pH 8 on 50 ml. of chloride cycle resin (a polystyrene resin containing quaternary ammonium groups—Dowex 1 X 2). The resin adsorbate is then eluted with 3% ammonium bicarbonate in 70% methanol, 25 ml. fractions being collected. Cuts 4, 5, and 6 are combined and filtered. The insoluble product is the ammonium 6-chloro-2-quinoxaline-carboxylate 1,4-dioxide, as determined by its characteristic UV spectrum and bioactivity. It crystallizes in bright yellow needles.

EXAMPLE 4

Sodium 6-chloro-2-quinoxalinecarboxylate 1,4-dioxide

A slurry of 1.5 g. of crystalline 6-chloro-2-quinoxalinecarboxylic acid 1,4-dioxide (obtained as in Example 2) in 100 ml. of water is adjusted to pH 6.6 with 0.53 N NaOH (11.7 ml. is required). The clear solution is treated with 200 mg. of carbon, filtered, diluted with five volumes of acetone, and cooled in the refrigerator for 2 hours. The product, sodium 6 - chloro-2-quinoxaline-carboxylate 1,4-dioxide, is collected by filtration, washed and dried.

UV (H₂O)

| λ max: | E% |
|---|---|
| 244 | 860 |
| 269 | 880 |
| 366 | 470 |
| 383 | 480 |

EXAMPLE 5

Methyl 6-chloro-2-quinoxalinecarboxylate 1,4-dioxide

A slurry of 1.0 g. of 6-chloro-2-quinoxalinecarboxylic acid 1,4-dioxide, prepared as in Example 1, in 20 ml. of methanol is treated with diazomethane in ether until no more reaction is observed. The mixture is concentrated to dryness under vacuum, washed with a small amount of methanol to remove red decomposition products and crystallized from 35 ml. of chloroform by adding 45 ml. of hexane. The methyl 6-chloro-2-quinoxalinecarboxylate 1,4-dioxide, M.P. 166–170° C. is obtained.

EXAMPLE 6 n-Butyl 6-chloro-2-quinoxalinecarboxylate 1,4-dioxide

Methyl 6-chloro-2-quinoxalinecarboxylate 1,4 - dioxide (100 mg.) is suspended in 100 ml. n-butyl alcohol and 1 ml. of triethylamine is added. The mixture is stored in the dark for 4 days and shaken occasionally. The resulting clear solution is concentrated to dryness and the residue is crystallized from 10 ml. of methanol to obtain n-butyl 6-chloro-2-quinoxalinecarboxylate 1,4-dioxide.

EXAMPLE 7

6-chloro-2-quinoxalinecarboxamide 1,4-dioxide

Methyl 6-chloro-2-quinoxalinecarboxylate 1,4 - dioxide (676 mg.) is dissolved in 675 ml. of methanol and filtered. Concentrated aqueous ammonium hydroxide (6 ml.) is added to the filtrate and the mixture is stirred 3 hours. The product is collected on a filter, washed with methanol, and dried to obtain the 6-chloro-2-quinoxalinecarboxamide 1,4-dioxide.

EXAMPLE 8

6-chloro-2-quinoxaline-N-methylcarboxamide 1,4-dioxide

A filtered solution of 215 mg. of methyl 6-chloro-2-quinoxalinecarboxylate 1,4-dioxide in 180 ml. of methanol is sparged with methylamine for 20 min. while stirring. The product is then stirred for ½ hour and refrigerated for ½ hour. The product is collected by filtration, washed with methanol and dried to give the 6-chloro-2-quinoxaline-N-methylcarboxamide 1,4-dioxide.

EXAMPLE 9

6-chloro-2-quinoxaline-N-dodecyclcarboxamide 1,4-dioxide

Dodecylamine (0.4) is added to a filtered solution of 200 mg. methyl 6-chloro-2-quinoxalinecarboxylate 1,4-dioxide in 200 ml. of methanol and allowed to stand for 4 days. The suspension is refrigerated for 2 days, the product collected by filtration, washed with methanol and dried to give the 6-chloro-2-quinoxaline-N-dodecylcarboxamide 1,4-dioxide.

EXAMPLE 10

6-chloro-2-quinoxaline-N-hydroxyethylcarboxamide 1,4-dioxide

Ethanolamine (0.1 ml.) is added to a filtered solution of 200 mg. of methyl 6-chloro-2-quinoxalinecarboxylate 1,4-dioxide in 200 ml. of methanol and allowed to stand for 4 days. The product is collected by filtration, washed with methanol and dried. The mother liquor is concentrated to dryness and slurried in 10 ml. of methanol. The product is collected by filtration, washed with methanol, and dried. The two products are combined and recrystallized from 200 ml. of ethanol to yield the 6-chloro-2-quinoxaline-N-hydroxyethylcarboxamide 1,4-dioxide.

EXAMPLE 11

6-chloro-2-quinoxalinecarboxylic acid hydrazide 1,4-dioxide

A filtered solution of 200 mg. of methyl 6-chloro-2-quinoxalinecarboxylate 1,4-dioxide in 300 ml. of methanol is stirred with 0.5 ml. of hydrazine hydrate in 10 ml. of methanol for 2 hours. The product is collected on a filter, washed with methanol, and dried. It is then recrystallized from 20 ml. of glacial acetic acid, washed with methanol, and dried to obtain the 6-chloro-2-quinoxalinecarboxylic acid hydrazide 1,4-dioxide. Differential thermal analysis shows no endotherm and no definite melting point, but a large exotherm with decomposition of the sample occurs at 250° C.

EXAMPLE 12

N-hydroxy-6-chloro-2-quinoxalinecarboxamide 1,4-dioxide

Methyl 6 - chloro - 2 - quinoxalinecarboxylate 1,4-dioxide (200 mg.) is dissolved in 200 ml. of methanol and filtered. Hydroxylamine is prepared by mixing 420 mg. of hydroxylamine hydrochloride in 5 ml. of methanol and 320 mg. of sodium methoxide in 5 ml. of methanol, and then filtering off the precipitated sodium chloride. This filtrate is added to the solution of the methyl ester and stirred for 3 hours. The product is collected on a filter, washed with methanol and dried. A sample is prepared for micro-analysis by dissolving 20 mg. in 20 ml. of water, adjusting to pH 10 with 0.1 N sodium hydroxide, filtering, and adjusting the filtrate to pH 6.5 with 1 ml. of 0.1 N acetic acid. The crystals are collected by filtration, washed with water, washed with methanol, and dried to obtain N - hydroxy - 6 - chloro - 2 - quinoxalinecarboxamide 1,4-dioxide.

Various changes and modifications in the procedures herein disclosed will occur to those skilled in the art, and to the extent that such changes and modifications are embraced by the appended claim, it is to be understood that they constitute part of our invention.

We claim:

1. A process for producing 6 - chloro - 2 - quinoxalinecarboxylic acid-1,4-dioxide which comprises cultivating 6 - chloro - 2 - quinoxalinecarboxylic acid-1,4-dioxide-producing strains of *Streptomyces ambofaciens* in an aqueous nutrient medium under aerobic conditions until substantial antimicrobial activity is imparted to said medium, and recovering 6-chloro - 2 - quinoxalinecarboxylic acid-1,4-dioxide from the resulting fermented broth as the free acid, or as a salt thereof.

References Cited

UNITED STATES PATENTS

| 2,943,023 | 6/1960 | Ninet et al. | 195—80 |
|---|---|---|---|
| 2,943,024 | 6/1960 | Ninet et al. | 195—80 |
| 2,943,025 | 6/1960 | Ninet et al. | 195—80 |
| 3,598,819 | 8/1971 | Stapley et al. | 195—80 X |

JOSEPH M. GOLIAN, Primary Examiner